J. F. POOLE.
COMBINED CULTIVATOR AND CORN-PLANTER.
No. 186,873. Patented Jan. 30, 1877.
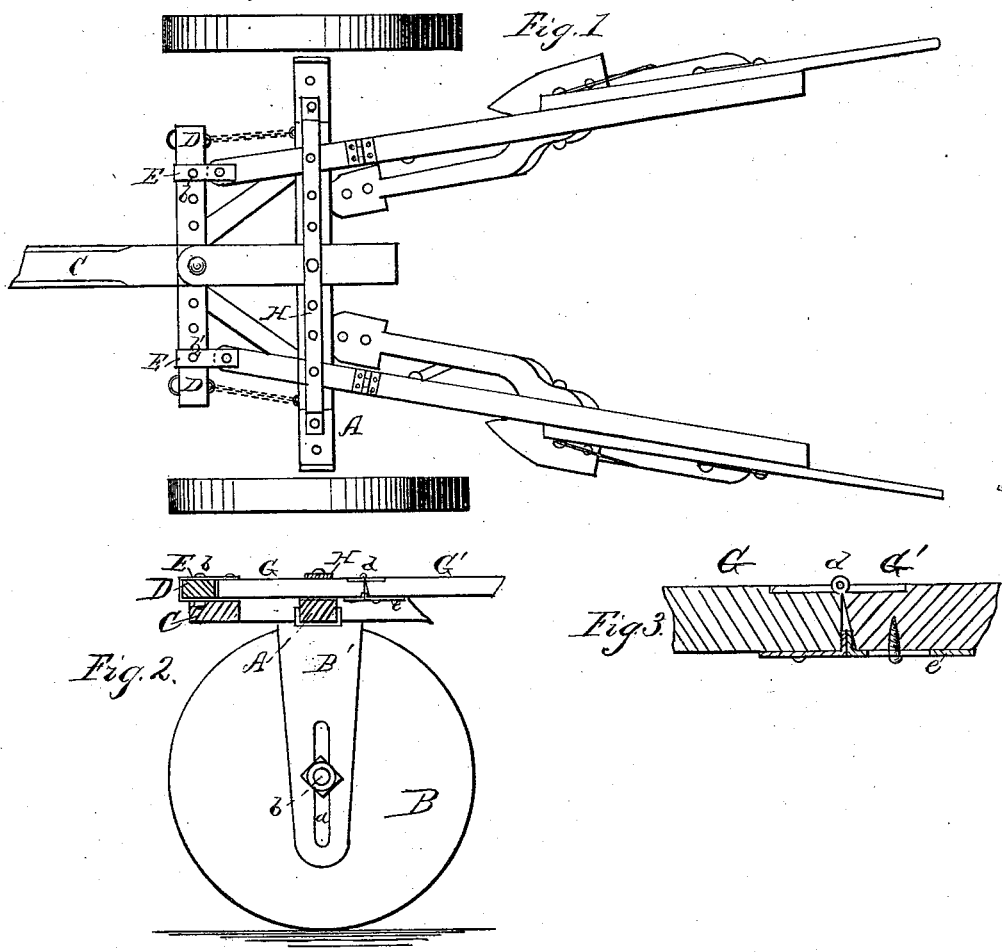

2 Sheets—Sheet 2.

J. F. POOLE.
COMBINED CULTIVATOR AND CORN-PLANTER.

No. 186,873. Patented Jan. 30, 1877.

Witnesses.
W. C. McArthur,
C. L. Evert.

Inventor.
Joseph F. Poole.
T. H. Alexander & Co.
Attorneys.

UNITED STATES PATENT OFFICE.

JOSEPH F. POOLE, OF MONROE, WISCONSIN, ASSIGNOR OF ONE-HALF HIS RIGHT TO E. C. GILLETT, OF SAME PLACE.

IMPROVEMENT IN COMBINED CULTIVATOR AND CORN-PLANTER.

Specification forming part of Letters Patent No. 186,873, dated January 30, 1877; application filed December 21, 1876.

*To all whom it may concern:*

Be it known that I, JOSEPH F. POOLE, of Monroe, in the county of Greene and State of Wisconsin, have invented certain new and useful Improvements in Combined Cultivators and Corn-Planters; and I do hereby declare that the following is a full, clear, and exact description thereof, reference being had to the accompanying drawings, and to the letters of reference marked thereon, which form part of this specification.

The nature of my invention consists in the construction and arrangement of a combined cultivator and corn-planter, as will be hereinafter more fully set forth.

In order to enable others skilled in the art to which my invention appertains to make and use the same, I will now proceed to describe its construction and operation, referring to the annexed drawings, in which—

Figure 4:
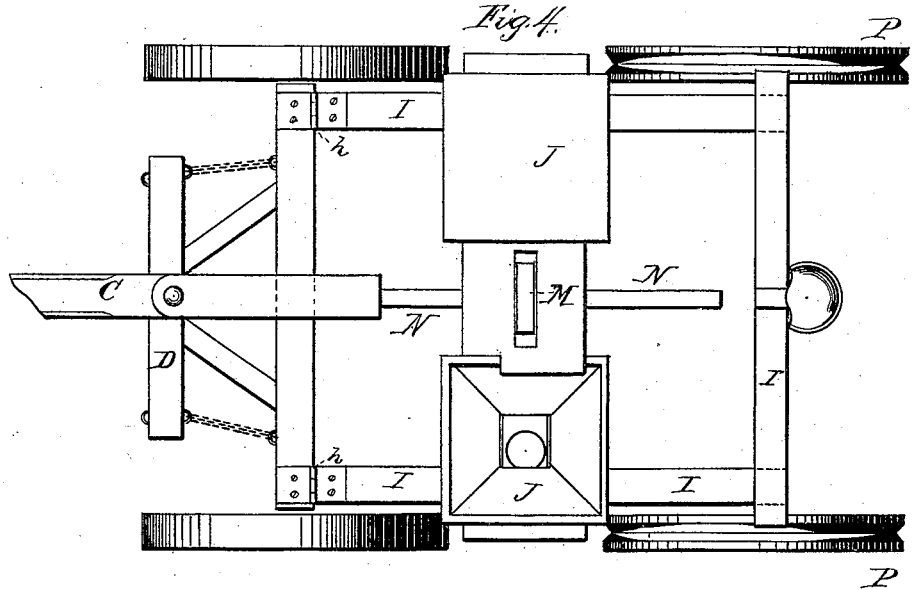
Figure 5:
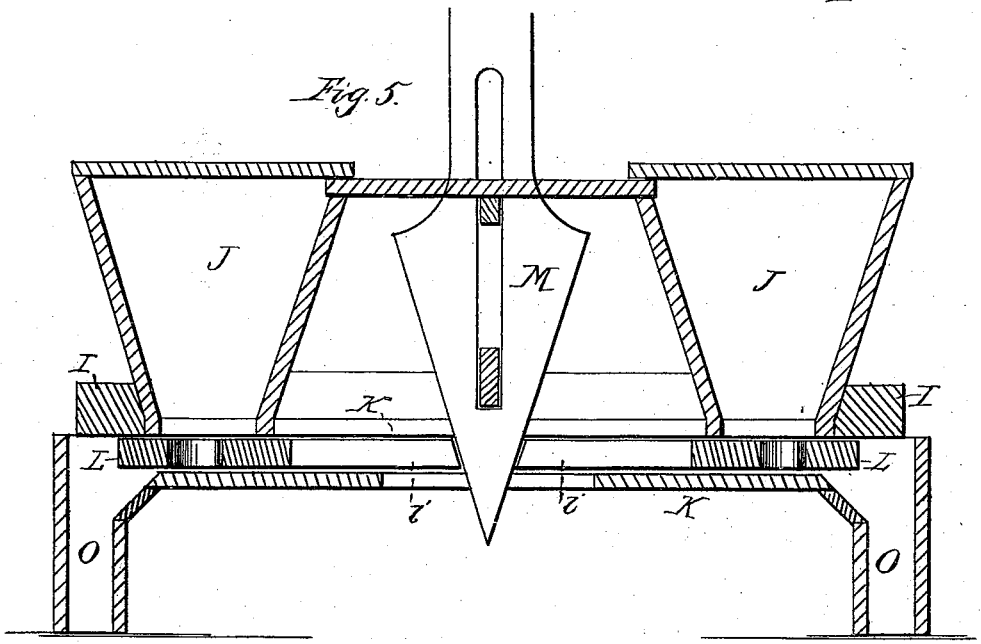

Figure 1 is a plan view of my invention when used as a cultivator. Figs. 2 and 3 are details of my cultivator. Fig. 4 is a plan view of my planter. Fig. 5 is a cross-section of the same.

A represents the cultivator-axle provided at each end with a downwardly-projecting plate, B', firmly secured to the axle. This plate is provided with a vertical slot, *a*, or a series of holes for adjusting the spindle *b*, upon which the driving-wheel B is placed, at any desired height. C is the tongue secured to the axle, and having the double-tree D pivoted thereon.

On each side of the center of the double-tree D is fastened a stirrup, E, by means of a bolt, *b'*, the ends of the stirrup being in rear of the double-tree, and has the front end of the cultivator-beam pivoted therein.

The bolts *b'* may be moved in different holes on the double-tree, thus adjusting the stirrups out or in as required to incline the shovels to or from the corn.

The plow-beams pass over the axle-tree, and under a guard, H, attached thereto, and are to be held in position by pins passing through said guard and axle.

Each plow-beam or cultivator-beam is made in two parts, G and G', hinged together at *d*, the front part G being pivoted in the stirrup E. On the under side of the rear part G' at the front end, is an adjustable flanged plate, *e*, which may be moved backward and forward to regulate the depth of the shovels in the earth. The working of the joints at *d* causes them to adapt themselves to the unevenness of the surface.

The cultivator-beams may be used under the axle-tree, as well as on top, and the guard H must then be on the under side thereof.

For a corn-planter, the cultivator-beams are detached from the stirrups E, and a frame, I, connected to the axle-tree A by means of hinged joints *h h*, one leaf of each of which is bolted on top of the axle-tree in such a manner as to be easily removed when the cultivator is to be used.

J J are the hoppers permanently secured on a box, K, in which the feed-slides L L work. M is a double wedge connected at its lower end to a treadle, N. By stepping on this treadle, or bearing down by hand on the double wedge, the slides L are forced outward to drop the corn, and the parts are returned to their position by means of springs *i i*.

O O are conductors and marking-shoes for the corn, and P P are the covering-wheels, having either concave or flat tires. These wheels are adjustable in plates, the same as described for the plates B' of the cultivator axle-tree.

Having thus fully described my invention, what I claim as new, and desire to secure by Letters Patent, is—

1. The cultivator-beam herein described, made of two parts, G G', hinged together, and provided with the adjustable flanged plate *e*, for regulating the depth at which the plow is to work, as set forth.

2. The combination of the tongue C, double-tree D, with adjustable stirrups E E, jointed cultivator-beams G G', axle-tree A, and guard H, all substantially as and for the purposes herein set forth.

In testimony that I claim the foregoing as my own I affix my signature in presence of two witnesses.

JOSEPH F. POOLE.

Witnesses:
J. S. SMOCK,
WILLARD PAYNE.